(12) United States Patent
Wolven

(10) Patent No.: US 7,074,360 B2
(45) Date of Patent: Jul. 11, 2006

(54) METHOD AND APPARATUS FOR POSITIONING A TOOL RELATIVE TO A WORKPIECE

(76) Inventor: Jeffrey T. Wolven, 363 N. 6000 W. Rd., Kankakee, IL (US) 60901

( * ) Notice: Subject to any disclaimer, the term of this patent is extended or adjusted under 35 U.S.C. 154(b) by 324 days.

(21) Appl. No.: 10/606,641

(22) Filed: Jun. 26, 2003

(65) Prior Publication Data

US 2004/0261908 A1 Dec. 30, 2004

(51) Int. Cl.
*C21B 7/10* (2006.01)
*B23K 7/00* (2006.01)

(52) U.S. Cl. .......................................... 266/46; 148/196
(58) Field of Classification Search .................. 266/48; 148/196

See application file for complete search history.

(56) References Cited

U.S. PATENT DOCUMENTS

| 4,014,439 A |   | 3/1977 | Kochalek et al. |
| 5,197,836 A | * | 3/1993 | Crivellin ..................... 409/200 |
| 5,256,212 A |   | 10/1993 | Magnuson |

6,600,250 B1 * 7/2003 Fedeli ........................ 310/114

FOREIGN PATENT DOCUMENTS

| DE | 199 38 058 A1 | 2/2001 |
| EP | 0 486 992 A1 | 5/1992 |
| EP | 1 103 340 A2 | 5/2001 |

OTHER PUBLICATIONS

European Search Reportin corresponding European patent application Serial No. 04 102 965.3, No Date.

* cited by examiner

*Primary Examiner*—Scott Kastler
(74) *Attorney, Agent, or Firm*—Wood, Phillips, Katz, Clark & Mortimer

(57) ABSTRACT

An apparatus for positioning a tool relative to a workpiece, including a first carrier rotatable on a first axis and a second carrier carried by the first carrier and rotatable about a second axis defined by the first carrier. The second axis is in a parallel and offset eccentric relationship to the first axis. A tool holder is secured to the second carrier in an offset eccentric relationship to the second axis, and a drive mechanism selectively rotatably drives the first carrier about the first axis and the second carrier about the second axis to selectively position the tool holder. A tool secured in the tool holder may be moved along a selected path relative to a workpiece.

18 Claims, 6 Drawing Sheets

METHOD AND APPARATUS FOR POSITIONING A TOOL RELATIVE TO A WORKPIECE

CROSS REFERENCE TO RELATED APPLICATION(S)

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

This invention relates generally to a method and apparatus for positioning a tool relative to a workpiece. The invention is particularly suitable for use in positioning a torch relative to workpieces such as structural steel members and the like.

BACKGROUND OF THE INVENTION AND TECHNICAL PROBLEMS POSED BY THE PRIOR ART

Reliable and efficient machine controlled tool positioners or other types of holders for various types of tools are desirable in many different applications and environments. For example, 5-axis numerically controlled machines are used to move tools such as drill bits (and may also move the workpieces themselves) through 3-dimensional space in order to perform the various machining operations desired to shape the workpieces. Given the complicated computer controls and various motors and drives required to move the tools and workpieces, such machines can be relatively expensive. Further, computer programming of the numerical control system can be time consuming and complicated. In some instances, for example, it may be necessary to only approximate the shape of particular curves by extrapolating between specific points on the curves, either requiring the time consuming determination of a large number of points or resulting in a machined curve which may vary slightly from the desired curve.

With particularly large and/or long workpieces, such as structural angle beams or channel beams, free access to move the tool along the length of the workpiece is not always available. In those applications, it has been known to support a suitable tool, such as a torch, for movement in a plane which is substantially normal to the length of the workpiece. For example, Magnuson U.S. Pat. No. 5,256,212 discloses an apparatus which supports a tool (such as a torch) on a ring for movement around the workpiece as the workpiece is moved longitudinally through the ring. The apparatus moves the tool around the workpiece in the two dimensions of the plane of the ring, and the workpiece is moved along its longitudinal length for relative movement between the tool and workpiece in the third dimension. The workpiece may be moved by a gripper connected to a conveyor or by a set of drive rollers which drivably engage the workpiece by squeezing against it.

With such tool supporting apparatuses, cutting by the torch is generally carried out in the center of the ring. A straight longitudinal cut can be provided by positioning the torch in an appropriate position and then moving the workpiece past the torch. A straight lateral cut can be provided by holding the workpiece still and moving the torch over the workpiece in the plane of the supporting ring. Large non-linear contours may be cut by combined movement of the torch around the ring and of the workpiece along its length. Further, for cutting small holes, this may be accomplished by properly positioning the torch and then cutting through the stationary workpiece. In this manner, it is possible to reach the entire surface of the workpiece being processed, whether it is for drilling, punching, burning, cutting or other operations.

However, for some cuts, a more complicated operation can be required. For example, different tools may be secured to the support apparatus depending on the type of operation required. Of course, where different types of operation are required on the same workpiece, the changeover time between tools can significantly reduce the efficient use of the apparatus. Further, the combined cost of different tools can significantly add to the cost of operation.

While a single tool such as a cutting torch may be used for a variety of different operations, thereby obviating the need for multiple tools, the use of a cutting torch for some operations in an apparatus such as noted above can be problematic. For example, when the operation involves cutting larger closed curves (e.g., larger holes), it may be necessary to reverse the direction of longitudinal motion of the workpiece, with such varying workpiece movement requiring relatively high rates of acceleration and deceleration in conjunction with movement of the torch. For example, if a small square hole is to be cut parallel to the longitudinal direction of the workpiece, the workpiece may need to change from a full stop (when the torch is cutting laterally) to full cut speed (when the torch is cutting longitudinally) in a fraction of an inch. At the end of that longitudinal cut, a similarly high deceleration to a stop would be required to change to lateral cutting again. It can be appreciated that a single hole can require a large number of high accelerations and decelerations of the workpiece. Moreover, the smaller the diameter of the corner of the hole, the greater the accelerations and decelerations required.

When such cuts are to be made in heavy materials, such as may be commonly found in structural steel members used in construction, or even in lighter weight materials moving at high speeds, the gear boxes and motors required to provide the necessary accelerations and decelerations can be large and expensive, sometimes impractically so. When the necessary equipment for moving the workpiece is inadequate, however, the holes and corners which are cut can be distorted due to the machine's inability to accelerate the workpiece quickly enough to full cut speed (or stop it quickly enough) during directional changes.

The present invention is directed toward overcoming one or more of the problems set forth above.

SUMMARY OF THE INVENTION

With various aspects of the present invention, a tool may be positioned or moved along a desired path within a range of motion to facilitate use of the tool in conjunction with workpieces on which the tool is to operate. Such manipulation may be accomplished through use of a tool mount secured to a yoke arm pivotable about an axis, and/or through the use of two eccentric carriers wherein positional feedback permits selective driving of the carriers to achieve such positioning and movement.

In an apparatus form of the present invention, a workpiece drive and tool mount or rotator assembly are provided for cutting an elongate workpiece along a cutting path with a cutting tool. The workpiece drive is adapted to selectively move a supported workpiece in the direction of an X-axis in a mutually orthogonal X, Y, and Z-axis coordinate system. The tool mount includes a first rotatable carrier having a first axis of rotation and a first drive gear, and a second carrier carried by the first carrier for rotation about a second axis where the first and second axes are spaced apart. Gear teeth circular to the second axis are provided on the second carrier, and a tool holder is adapted to mount the tool to the second carrier with the tool oriented generally parallel to and spaced from the second axis. A ring gear is rotatable about the first axis and engages the gear teeth on the second carrier. A drive is adapted to selectively drive the first drive gear and the ring gear to selectively position and move the tool, and a guide ring may support the tool mount for motion in the Y and Z directions and for rotational movement about a workpiece.

In one form of this aspect of the invention, the first and second axes are spaced apart a distance S and the tool and the second axis are spaced apart a distance T, whereby the apparatus is adapted to cut at least some paths fitting within or on a circle having a radius S+T. In a further form, S=T whereby the apparatus is adapted to cut any path fitting within or on a circle having a radius S+T.

In another form, the first and second drives are adapted to selectively drive the first carrier and the ring gear, respectively, through different angles of rotation to position the tool at a selected distance from the first axis of rotation. Alternatively, the first drive and second drive may drive the first drive gear and the ring gear at an equal rate of rotation whereby the tool is moved in a circle about the first axis of rotation.

In still another form of this aspect of the invention, the drive engages the ring gear, and a first drive lock locks the first carrier to the ring gear when the ring gear is driven in a first direction of rotation, and a second drive lock prevents rotation of the first carrier when the ring gear is driven in a second direction of rotation opposite the first direction of rotation.

In yet another form, a tilt support between the guide ring and the tool mount is selectively tiltable relative to a workpiece surface lying generally in the X-Y plane to compensate for the angle of the side of the kerf or to provide a selected bevel cut.

In another apparatus aspect of the present invention for positioning a tool relative to a workpiece, a first carrier is rotatable on a first axis and a second carrier is carried by the first carrier and rotatable about a second axis defined by the first carrier. The second axis is in a parallel and offset eccentric relationship to the first axis. A tool holder is secured to the second carrier in an offset eccentric relationship to the second axis, and a drive mechanism selectively rotatably drives the first carrier about the first axis and the second carrier about the second axis to selectively position the tool holder.

The various forms of the first described apparatus aspect of the present invention may advantageously be used with this aspect of the invention, as may the below described forms of this aspect of the invention be used with the first described aspect of the invention.

For example, in one form, the tool may be selectively positioned within an area circular about the first axis, where the area has a radius which is the sum of the eccentric relationship of the second carrier to the first axis and the eccentric relationship of the tool holder to the second axis.

In another form of this aspect of the invention, a ring gear is rotatable about the first axis and engages external gear teeth on the second carrier, and a drive selectively rotates the ring gear. A first drive lock locks the first carrier to the ring gear when the ring gear is driven in a first direction of rotation, and a second drive lock prevents rotation of the first carrier when the ring gear is driven in a second direction of rotation opposite the first direction of rotation.

In still another form, the first carrier includes a sleeve having a cylindrical receiving bore that defines the second axis, and the second carrier includes (1) a cylindrical exterior portion rotatably received within the cylindrical receiving bore, and (2) an external gear circular around the second axis. With this form, the ring gear may be rotatable about the first axis and engage the second carrier external gear, with the ring gear having a radius substantially equal to the radius of the external gear plus the offset, or eccentric, distance between the first axis and the second axis.

In a method aspect of the present invention, a method of moving a tool relative to a workpiece using a first carrier rotatable about a first axis is provided, comprising the steps of (1) mounting the tool to a second carrier rotatably carried by the first carrier for rotation about a second axis defined by the first carrier, the second axis being eccentric to the first axis and the cutting tool being eccentric to the second axis, and (2) moving the tool along a selected path by selectively rotatably driving the first carrier about the first axis and the second carrier about the second axis.

In one form of this method aspect of the present invention, the first and second carriers are separately rotatably driven during the moving step.

In another form, the second carrier is supported in driving engagement with internal teeth of a ring gear rotatable about the first axis, wherein during the moving step the tool is selectively moved by selectively driving the first carrier and the ring gear. In a further form, the tool is moved to cut a cylindrical hole with the moving step including (1) rotating the first carrier and the ring gear to locate the tool at a distance from the first axis equal to the radius of the cylindrical hole, (2) aligning the tool relative to the workpiece whereby the first axis coincides with the axis of the cylindrical hole to be cut, and (3) cutting the cylindrical hole with the cutting tool while rotating the first carrier and the ring gear at an equal rate of rotation about the first axis. In further forms, the first carrier is locked against rotation in one direction, and the first carrier and the ring gear are locked against relative rotation when the ring gear is rotated in the direction opposite the one direction, and the workpiece is restrained against movement during cutting of the hole.

Numerous advantages and features of the present invention will become readily apparent from the following detailed description of the invention, from the claims, and from the accompanying drawings.

BRIEF DESCRIPTION OF THE DRAWINGS

In the accompanying drawings that form part of the specification, in which like numerals are employed to designate like parts throughout the same.

DETAILED DESCRIPTION

While this invention is susceptible of embodiment in many different forms, this specification and the accompanying drawings disclose only specific forms as examples of the invention. The invention is not intended to be limited to the forms so described, however. The scope of the invention is pointed out in the appended claims.

Figures illustrating the apparatus show some mechanical elements that are known and that will be recognized by one skilled in the art. The detailed descriptions of such elements are not necessary to an understanding of the invention, and accordingly, are herein presented only to the degree necessary to facilitate an understanding of the novel features of the present invention.

Figure 1:
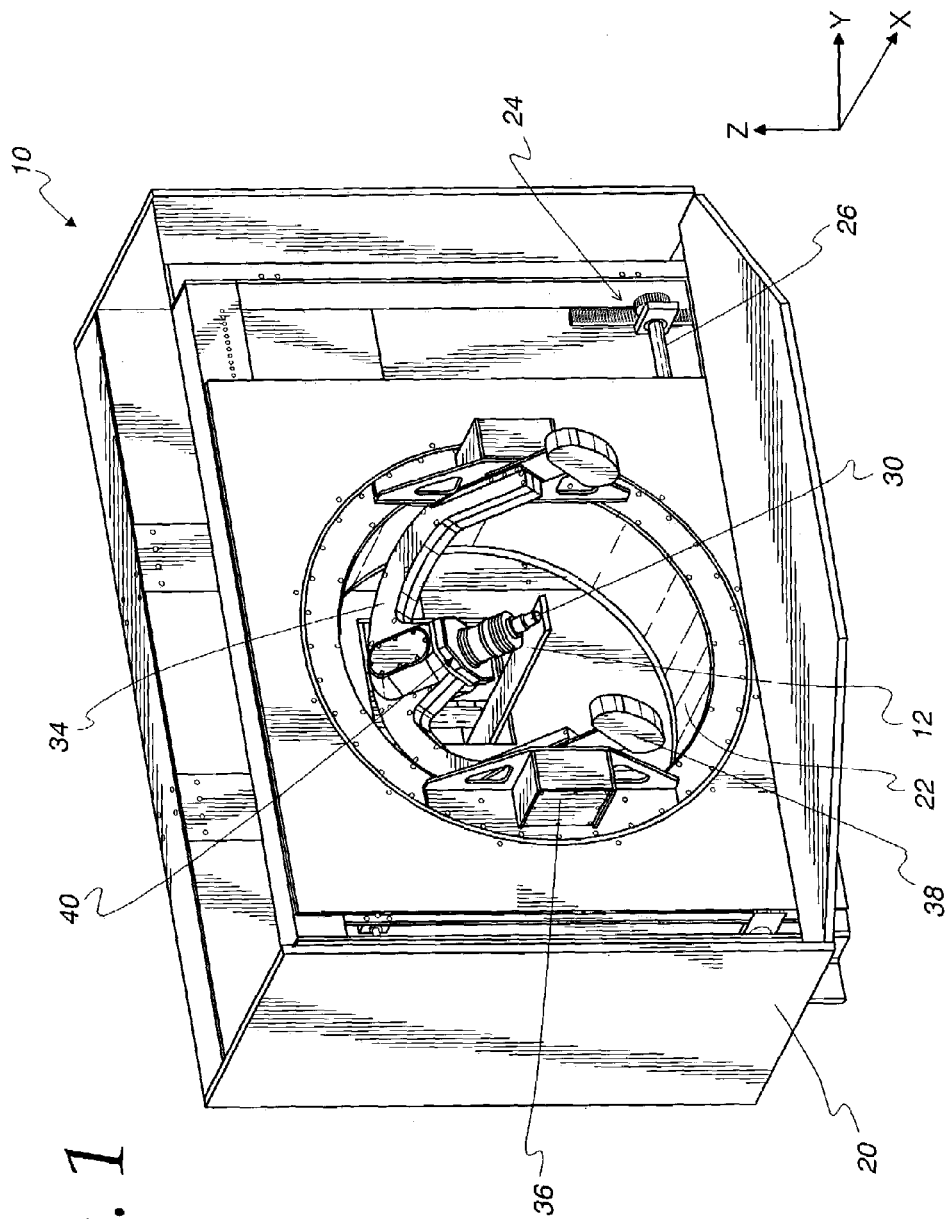
FIG. 1 is a perspective view of an exemplary tool positioning apparatus incorporating the present invention and which is especially suitable for positioning a torch for cutting a longitudinally elongate workpiece such as the illustrated elongate sheet of flat stock.

FIG. 1 illustrates a tool positioning apparatus 10 which may be advantageously used with longitudinally elongated workpieces, with one such workpiece 12 being shown. Broadly, this apparatus is similar to that shown in U.S. Pat. No. 5,256,212 with the improvements discussed below. The complete disclosure of U.S. Pat. No. 5,256,212 is hereby fully incorporated by reference.

As illustrated, the tool positioning apparatus 10 includes a support frame 20 for a guide ring 22. The guide ring 22 is suitably supported by the frame 20 for rotation around its central axis, and is further suitably supported for movement in the Y-Z plane of a mutually orthogonal X, Y, and Z-axis coordinate system (i.e., moves up and down and laterally or sideways). In FIG. 1, a rack and pinion 24 is illustrated including a suitable drive shaft 26 as one suitable drive for moving the guide ring 22 in the vertical direction (Z-axis). A similar drive (not visible in FIG. 1) may be used to move the guide ring 22 horizontally (Y-axis). However, it should be understood that these drives are merely examples of drives which might be used. Suitable structures for moving such a guide ring 22 in the Y-Z plane are known to those skilled in the art, and any suitable structure for controlling such movement could be used with embodiments of the present invention such as disclosed in FIG. 1.

A workpiece 12 is suitably supported for longitudinal movement generally along the axis of the guide ring 22, as by conventional or special mechanisms such as driven rollers or a conveyor (not shown), which axis is generally parallel with the X-axis of the orthogonal coordinate system. By moving the workpiece 12 in the X direction and moving the guide ring 22 in the Y-Z plane and about the central axis, a supported tool 30 can be readily positioned to reach most points on the longitudinal workpiece 12. Rotation of the guide ring 22 through 360 degrees, by suitable conventional or special mechanisms (not visible in FIG. 1), permits the tool 30 to be positioned normal to any surface on the workpiece 12 for desired processing. Control and power wires and cables (not shown) may be suitably supported in the apparatus 10, for example with a guide track, to permit such motion of the guide ring 22 without binding or twisting the wires and cables.

The mechanisms for moving the workpiece 12, for moving the guide ring 22 in the Y-Z plane, and for rotating the guide ring 22 may employ suitable conventional or special designs. The details of such designs form no part of the present invention.

In the illustrated embodiment, the tool 30 is a plasma torch having a flame which will suitably cut the workpiece 12. Such a torch 30 can be advantageously used for many different operations, thereby providing efficient use of the apparatus 10 by permitting virtually all operations to be provided with the one tool 30, inasmuch as the apparatus 10 may operate continuously without requiring down time to change between different types of tools (e.g., changing to a drill in order to cut a hole after making long cuts is not required). Further, such operation may be advantageously provided in apparatuses where space or other limitations prevent the mounting of other tools, such as drills or presses, in which case the torch 30, for example, might be the only tool which would be available to perform the desired operation. However, it should be understood that the present invention may be advantageously used with a wide variety of tools requiring positioning during operation, including devices where the tools may be changed from time to time.

Moreover, through the use of the present invention incorporated in this apparatus 10 as described below, the tool 30 may be advantageously positioned without requiring fast acceleration and deceleration of the workpiece 12 for many types of operations, thereby allowing inexpensive and compact gear boxes and motors to be used to drive the workpiece 12 along its length and also ensuring that undistorted cuts (such as holes and corners) can be made.

A semicircular yoke arm 34 may also be advantageously included with the illustrated embodiment to permit the tool 30 to be tilted at an angle to compensate for the angle of the side of the kerf or to provide a selected bevel cut where desired. Specifically, the yoke arm 34 is secured at opposite ends about a pivot axis lying in the Y-Z plane, with the pivot axis passing through the guide ring central axis (which is parallel to the X-axis). A suitable drive 36 may be provided to control the pivotal position of the yoke arm 34, and suitable counterweights 38 may also be provided to help in maintaining a weight balance, and permit use of a compact and inexpensive yoke arm drive 36 by minimizing the moment when the yoke arm 34 is pivoted. It should thus be appreciated that this yoke arm 34 will permit a cutting tool 30, such as a torch, to be tilted to provide a beveled or angled cut, or to compensate for the natural kerf of a cut where desired, while at the same time still leaving the tool 30 at the desired cutting point at the cental axis of the guide ring 22. The yoke arm tilt drive 36 may have any suitable conventional or special design, and the detailed design forms no part of the present invention.

Reference will now be made to a tool mount 40, which is one aspect of the present invention, and which may alternatively be characterized as a rotator assembly. The tool mount 40 supports the tool 30 on the yoke arm 34 as illustrated in FIG. 1 and, according to an aspect of the present invention, the tool mount 40 can be operated in a novel manner, as explained in detail hereafter, to effect movement of the tool 30 out of the Y-Z plane. More specifically, when the tool 30 is supported so as to be oriented in the Y-Z plane by the yoke arm 34, the tool mount 40 can be operated to effect some movement of the tool 30 in the direction of the X-axis. When the tool mount 40 is tilted out of orientation in the Y-Z plane by the yoke arm 34 to an angled orientation, the tool 30 will similarly be tilted relative to the X-Y-Z coordinate system, but within that tilted orientation the tool mount can still generally be operated to effect movement of the tool 30 in the direction of the X-axis (the only case in which such movement would not occur would be if the tool mount 40 were tilted by the yoke arm 34 to an orientation in which the axis of the tool 30 is parallel to the X-axis).

Accordingly, once an understanding of the tool mount 40 is had, it should be appreciated that the tool 30 may be moved to, inter alia, process (e.g., cut) a wide variety of shapes in workpieces 12, including circular, square, slotted and other holes extending in the direction of the X-axis and fitting within the range of motion of the tool 30 as described below. Such cuts may be made without requiring large accelerations and decelerations of the movement of the ofttimes heavy workpiece 12, and without distorting portions of the cuts (e.g., sharp corners). Moreover, the tool mount 40 is compact and thus can be particularly advantageously used in applications where space is limited, such as with the illustrated guide ring 22.

Figure 2:
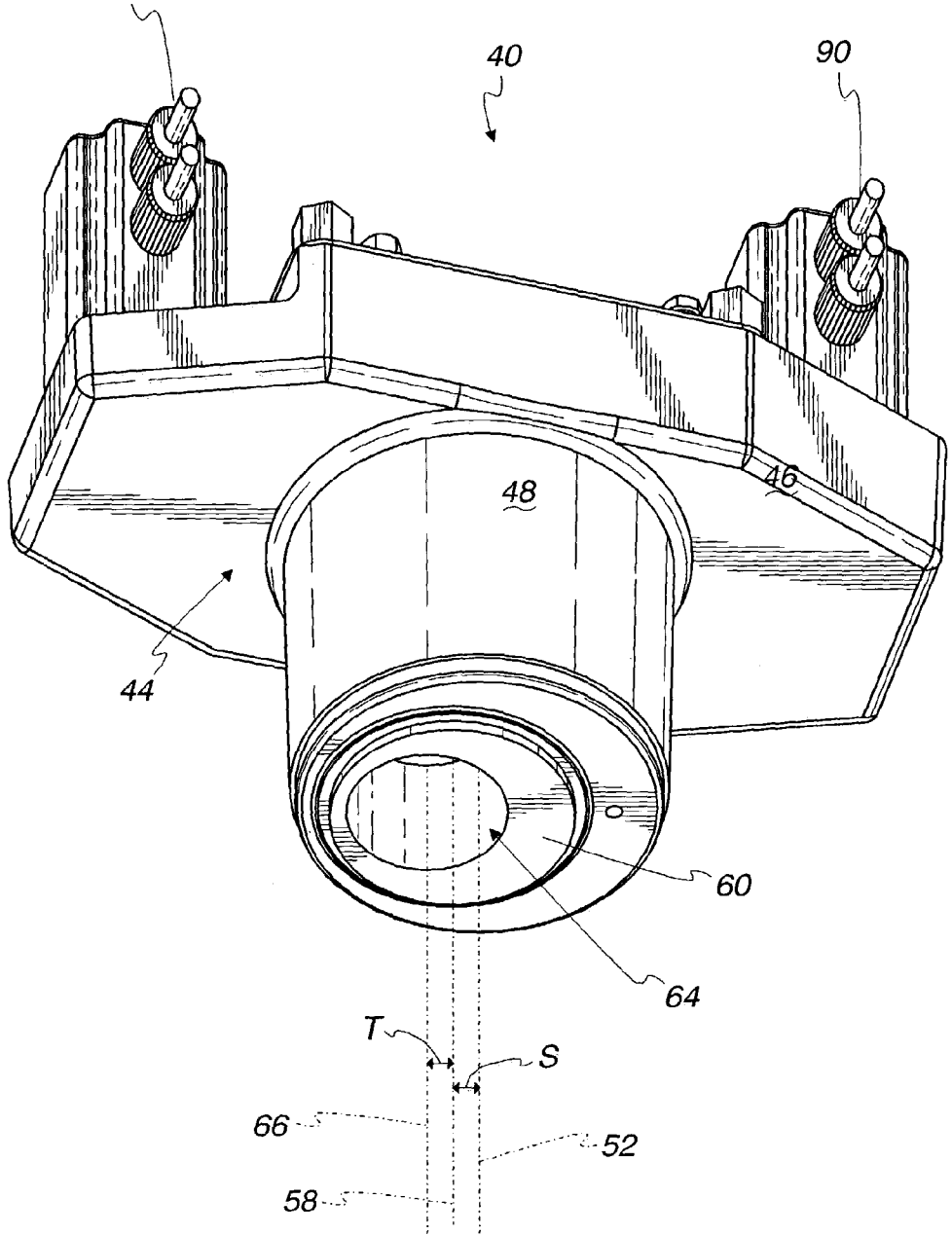
FIG. 2 is a perspective view of the tool moving device included in the apparatus of FIG. 1, with the tool (e.g., torch) omitted from FIG. 2 for ease of illustration.
Figure 3:
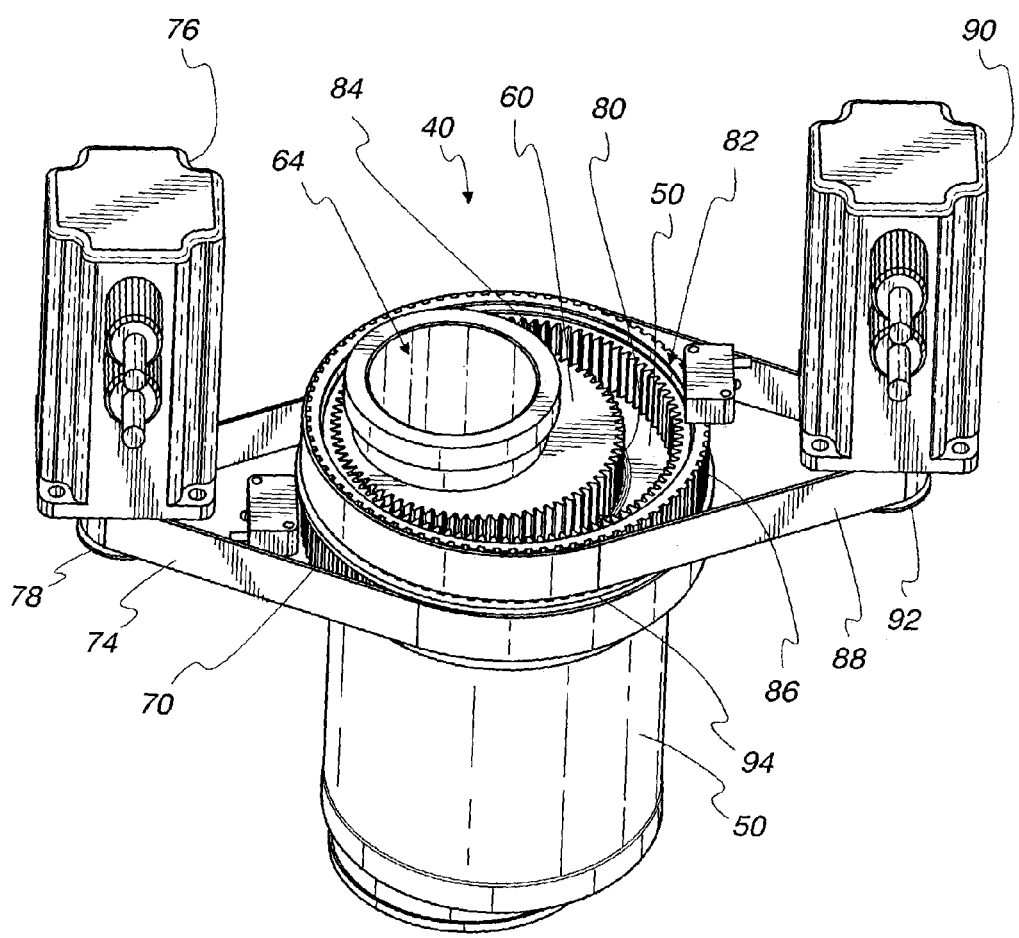
FIG. 3 is a perspective view of the FIG. 2 device with the drive housing removed for illustrative purposes.
Figure 4:
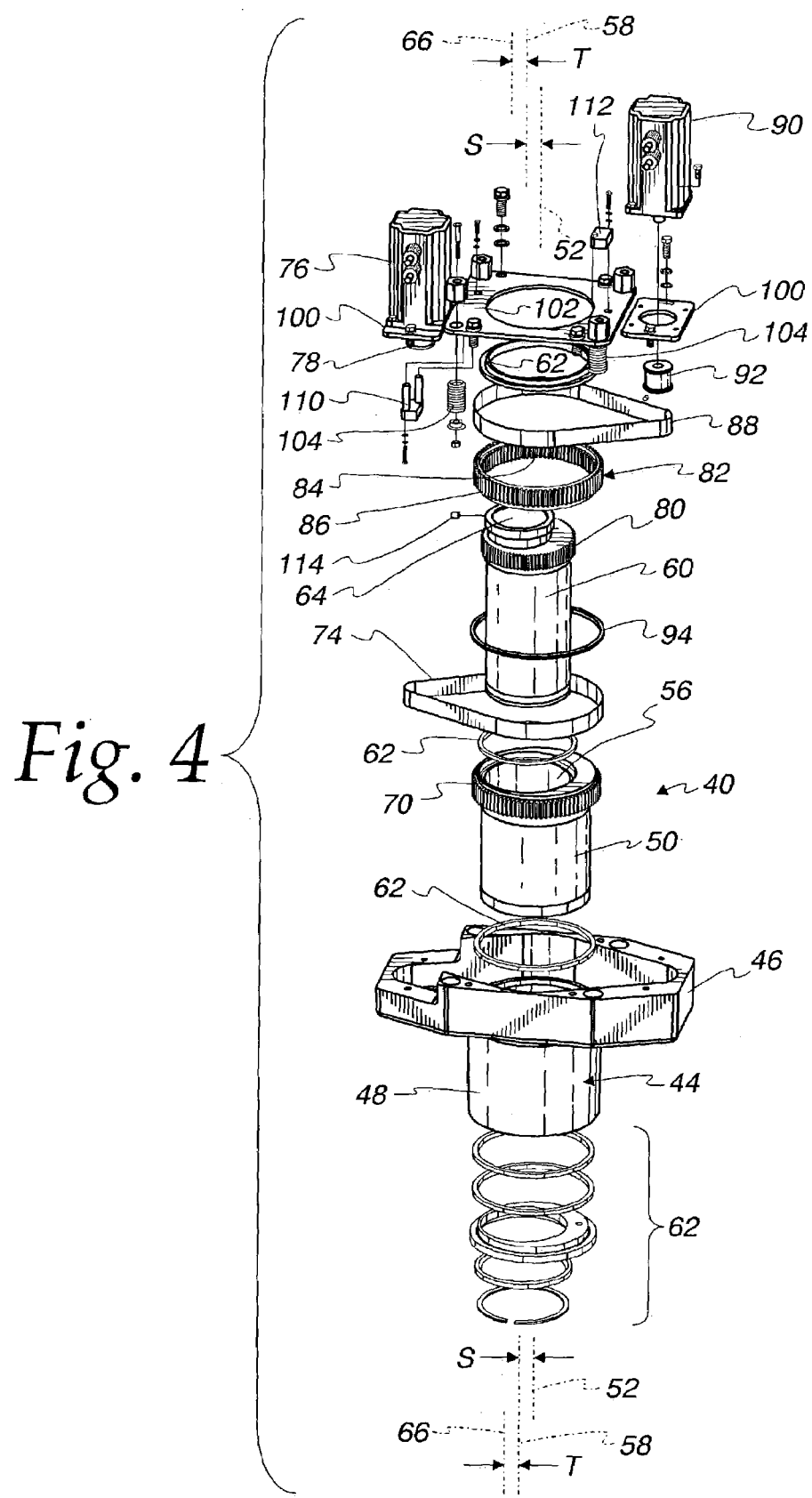
FIG. 4 is an exploded, perspective view of the tool moving device of FIG. 2.

FIGS. 2–4 in particular illustrate a tool mount 40 incorporating this aspect of the present invention.

Specifically, as can be seen in FIG. 2, a housing 44 is provided including a drive guard portion 46 and a sleeve guide 48. With reference to FIG. 3, which shows the tool mount 40 prior to installation of the housing, an outer eccentric sleeve or first carrier 50 is suitably rotatably supported within the sleeve guide 48 (FIG. 2) for rotation about a central axis 52 (FIG. 2).

The outer or first carrier 50 includes an opening 56 (FIG. 4) therein which is cylindrical about a second axis 58 (FIG. 4) which is eccentric from the outer carrier central axis 52 by a distance S. As can be seen in FIG. 4, an inner eccentric sleeve or second carrier 60 is suitably rotatably supported in the outer, second carrier cylindrical opening 56 for rotation about the second axis 58. Suitable bearing, retainer and guide rings 62 may be used to secure the carriers 50, 60 for desired rotation.

The inner (second) carrier 60 supports or includes a tool holder which, in the presently preferred form illustrated, includes at least an opening 64 (FIG. 4) that is defined in the inner carrier and that is cylindrical about a third axis 66 which is eccentric from the second axis 58 by a distance T. The inner carrier opening 64 functions as a tool holder whereby the tool 30 (not shown in FIGS. 2–4) may be suitably secured during operation so that its axis (e.g., the axis of a torch flame) is aligned with the third axis 66. The particular way in which the tool holder secures a tool 30 in or on the carrier 60 forms no part of the present invention.

With reference to FIG. 4, an outer gear 70 cylindrical about the first axis 52 is suitably secured to or integrally formed with the outer carrier 50. A suitable, first drive, such as the timing belt 74 coupled to a servo motor 76 via a belt pulley 78 (FIG. 3) in the illustrated embodiment, selectively rotates the outer carrier 50 through its engagement with the outer gear 70 for positioning the tool 30 as described in greater detail hereafter.

An outer gear 80 cylindrical about the second axis 58 is suitably secured to or integrally formed with the inner carrier 60. A ring gear 82 having inner gear teeth 84 engaged with the gear 80 and having outer gear teeth 86 is suitably rotatably supported with its axis aligned with the first axis 52 (i.e., the axis of the first carrier 50).

A suitable, second drive, such as the timing belt 88 coupled to a servo motor 90 via a belt pulley 92 in the illustrated embodiment, selectively rotates the inner, second carrier 60 through its engagement with the ring gear outer teeth 86 for positioning the tool 30 as described in greater detail hereafter. A spacer 94 may be provided between the timing belts 74, 88.

The motors 76, 90 are suitably secured, as by bolting to motor mount plates 100 secured to the housing 44. Further, a retainer plate 102 is secured to the housing 44 by suitable bolts and compression springs 104 as is desirable to secure the components by the previously mentioned bearing, retainer and guide rings 62.

Inductive proximity switches 110, 112 are also provided adjacent the timing belt pulleys 78, 92, which switches measure the proximity of set screws 114 on the carriers 50, 60 (only the set screw 114 for the second carrier 60 is shown in FIG. 4). The carriers 50, 60 may thus be homed to an initial position using these switches 110, 112 (with the outer, first carrier 50 homed first, followed by the inner, second carrier 60), and from that home position the timing belts 74, 88 may be selectively driven to move the ring gear 82 and carriers 50, 60 and predictably position and move the mounted tool 30 in a plane perpendicular to the axes 52, 58, 66. It should be understood, however, that any structure which will allow the position of the carriers 50, 60 to be known, whereby the position of the mounted tool 30 may similarly be known, may be suitably used with this aspect of the present invention.

Movement of the carriers 50, 60 and the ring gear 82 to position the tool 30 will next be described in detail.

Rotation of the first carrier 50 while the ring gear 82 is stationary will cause the second carrier 60 to be carried or rotated around the first axis 52 and, as it is carried around the first axis 52, the second carrier 60 will also be caused to rotate about the second axis 58 as its outer gear 80 crawls along the inner gear teeth 84 of the ring gear 82. Thus, a flame of a mounted torch 30 will follow the third axis 66, which is both carried and rotated around the first axis 52 and around the second axis 58 simultaneously. Such a torch 30 may be supported so that it (and its flame) may or may not rotate on the third axis 66 per se.

On the other hand, rotation of the ring gear 82 while the first carrier 50 is stationary will simply cause the second carrier 60 to merely rotate on its axis 58, so that the flame of an eccentrically or offset mounted torch will be carried or rotated around the second axis 58, with the second axis 58 remaining in a fixed orientation relative to the first axis 52.

Of course, operation could be accomplished with both the first carrier 50 and the ring gear 82 simultaneously rotated by their respective servo motors 76, 90, with such selective rotation combining to position a mounted tool 30. It should thus now be appreciated that a tool 30 carried by the tool mount 40 may be positioned in a circle lying in a plane perpendicular to the parallel axes 52, 58, 66, with the circle having a radius equal to the sum of the eccentricities S+T, and where S=T the tool 30 may be mounted anywhere within that circle. For example, if both eccentricities are 0.375 inches, then the tool may be positioned anywhere in a circle centered on the first axis 52 and having a radius of 0.75 inches. Further, in an advantageous configuration where S=T, the tool mount 40 may be parked in a position for normal tooling (when X-axis movement is not necessary) in which the third axis 66 coincides with the first axis 52.

Figure 5:
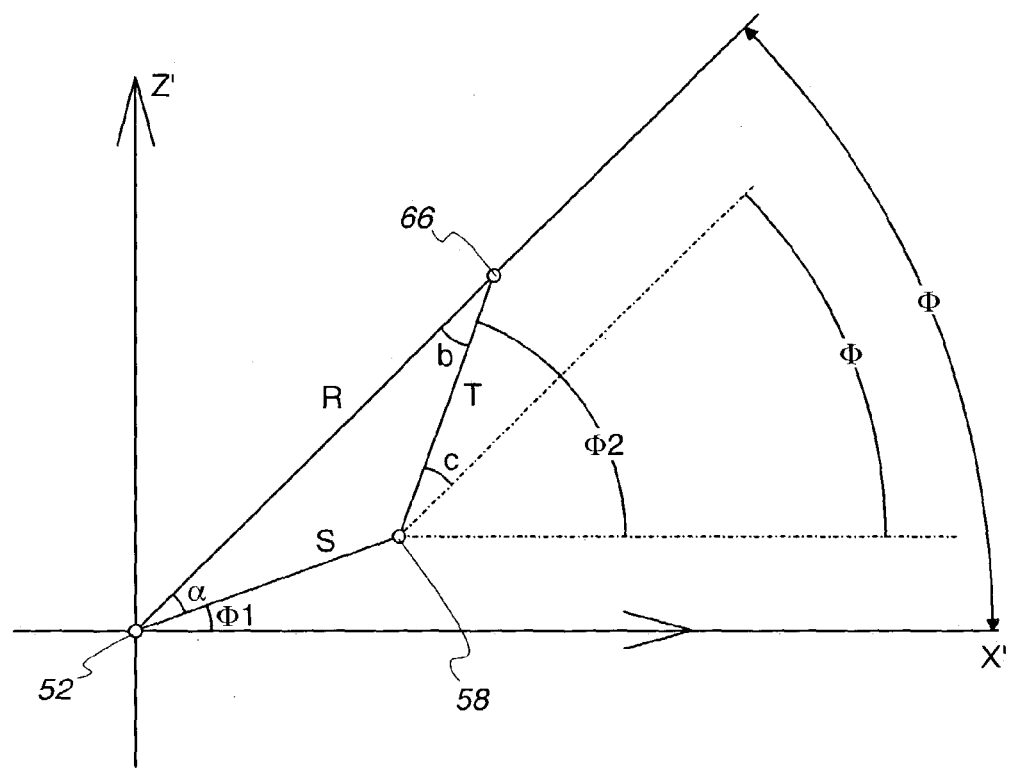
FIG. 5 is a chart illustrating the geometry of the positioning of a tool using a tool moving device in accordance with the present invention.

FIG. 5 illustrates the geometry used to properly position the tool 30 at a desired point, where any selected point may be defined in the X'-Z' plane by the angle $\phi$ from the X'-axis and the radius R from the first axis 52. The X' and Z' axes correspond to the X-Z directions as illustrated, for example, in FIG. 1, when the guide ring 22 and yoke arm 34 are oriented to position a mounted tool 30 directly above a workpiece 12 with the third axis 66 being vertical. Reference is made to the X' and Z' axes in FIG. 5 in view of the fact that the guide ring 22 and yoke arm 34 may be pivoted to shift the orientation of the three dimensional coordinate system.

Specifically, based on the law of cosines:

$$\alpha = \text{Arc cosine} [(S^2+R^2-T^2)/(2*S*R)] \quad (1)$$

It should be understood that the tool mount 40 may be designed with virtually any desired eccentricities S and T. However, in an advantageous embodiment, it should be appreciated that S=T to allow a tool 30 oriented with the third axis 66 to be aligned with the first axis 52 in the advantageous park position for normal tooling when X-axis movement is not required as previously indicated.

For simplicity in the below calculations, the eccentricities are both assumed to be 0.375 inch (i.e., S=T=0.375 inch). It should be appreciated, however, that it would be well within the skill of those in this art to modify the below calculations and formulas for different eccentricities. From formula (1), given that S=T=0.375 inch, then:

$$\alpha = \text{Arc cosine} (R^2/0.75R) = \text{Arc cosine} (R/0.75) \quad (2)$$

Further, since S=T, then $\alpha=b=c$, and it can be seen from FIG. 5 that:

$$\phi 1 = \phi - \alpha \quad (3)$$

Substituting equation (2) into equation (3) yields:

$$\phi 1 = \phi - \text{Arc cosine} (R/0.75), \quad (4)$$

where $\phi 1$ is the angular orientation of the outer carrier 50 from its home position (where the first axis 52 [FIG. 4] is positioned on the X'-axis in the home position).

Further, it can be seen from FIG. 5 that:

$$\phi 2 = \phi + c \quad (5)$$

Since, as already noted, $\alpha=c$ where S=T, equation (2) can be substituted into equation (5) yielding:

$$\phi 2 = \phi + \text{Arc cosine} (R/0.75), \quad (6)$$

where $\phi 2$ is the angular orientation of the inner carrier 60 from the X'-axis. In this example, the home position for both carriers 50, 60 is extended out along the X'-axis whereby when both carriers 50, 60 are in their home position with $\phi 1=0$ and $\phi 2=0$. Where S=T=0.375 inch as in this example, in the home position of both carriers 50, 60, the third axis 66 (FIG. 4) is located along the X'-axis 0.75 inch from the first axis 52 (FIG. 4).

Further, since the rotation of the inner carrier 60 is controlled by both the ring gear 82 and the rotation of the outer carrier 50, it can be determined that the rotation of the ring gear 82 to position the inner carrier 60 at the angle $\phi 2$ requires that the ring gear 82 be rotated through an angle $\phi 3$ from the home position, where $\phi 3$ is calculated as follows:

$$\phi 3 = [(\phi 2 - \phi 1)/G] + \phi 1, \quad (7)$$

where G is the gear ratio of the ring gear 82 to the outer gear 80 of the inner carrier 50. Substituting in equations (4) and (6), it can be seen that:

$$\phi 3 = \{[2*\text{Arc cosine} (R/0.75)]/G\} + \phi - \text{Arc cosine} (R/0.75) \quad (8)$$

Thus, it should be appreciated from known design parameters for the tool holder 40 (i.e., gear ratio G and eccentricities S and T) and two known coordinates (i.e., R and $\phi$) sufficient to define a selected point in the X'-Z' plane, the tool 30 may be positioned at the selected point by rotating the outer carrier 50 through an angle of $\phi 1$ (as determined from equation (4)) from its home position (as detected by proximity switch 110) and rotating the ring gear 82 through an angle of $\phi 3$ (as determined from equation (8)) from its home position (as detected by proximity switch 112). Thus, a tool 30 secured to the tool mount 40 may be readily positioned in any desired point within the circular range of motion by selectively rotating the outer carrier 50 and ring gear 82 selected amounts.

Accordingly, complex shapes which fit within such a circle and which extend in the longitudinal (X'-axis) direction of a workpiece 12 may be cut without requiring any movement of the workpiece 12. Thus, the large and expensive drives such as previously discussed may be avoided, as may distortions in the cuts. The tool 30 is significantly smaller than such workpieces 12 and thus the X'-direction movement required for the cut may be accomplished with smaller and less expensive drives (such as the servo motors 76, 90) than would be required to move the workpiece 12 if it would need to be moved in the X'-direction during cutting. Moreover, the changes in direction required for such cutting may be quickly accomplished and thereby even sharp corners may be cut without distorting the corners of the cut.

Further, to move a tool 30 through a circle having a radius R (e.g., to cut a round hole having a radius R), it should be appreciated that the carriers 50, 60 may be rotated relative to one another to position the tool 30 at the selected radius R (see FIG. 5) from the first axis 52, and then the timing belts 74, 88 may be rotated together at the same speed (whereby the first carrier outer gear 70 rotates together with the ring gear 82) to cause the tool to move in a path which is a circle having a radius R around the first axis 52. Such a circle is cut without having to calculate points to interpolate the path such as is required with many tool positioning devices. Thus, not only is the cut path an exact circle, but the chance of errors inherent in calculated paths requiring constantly changing speed and direction during cutting is eliminated.

Figure 6:
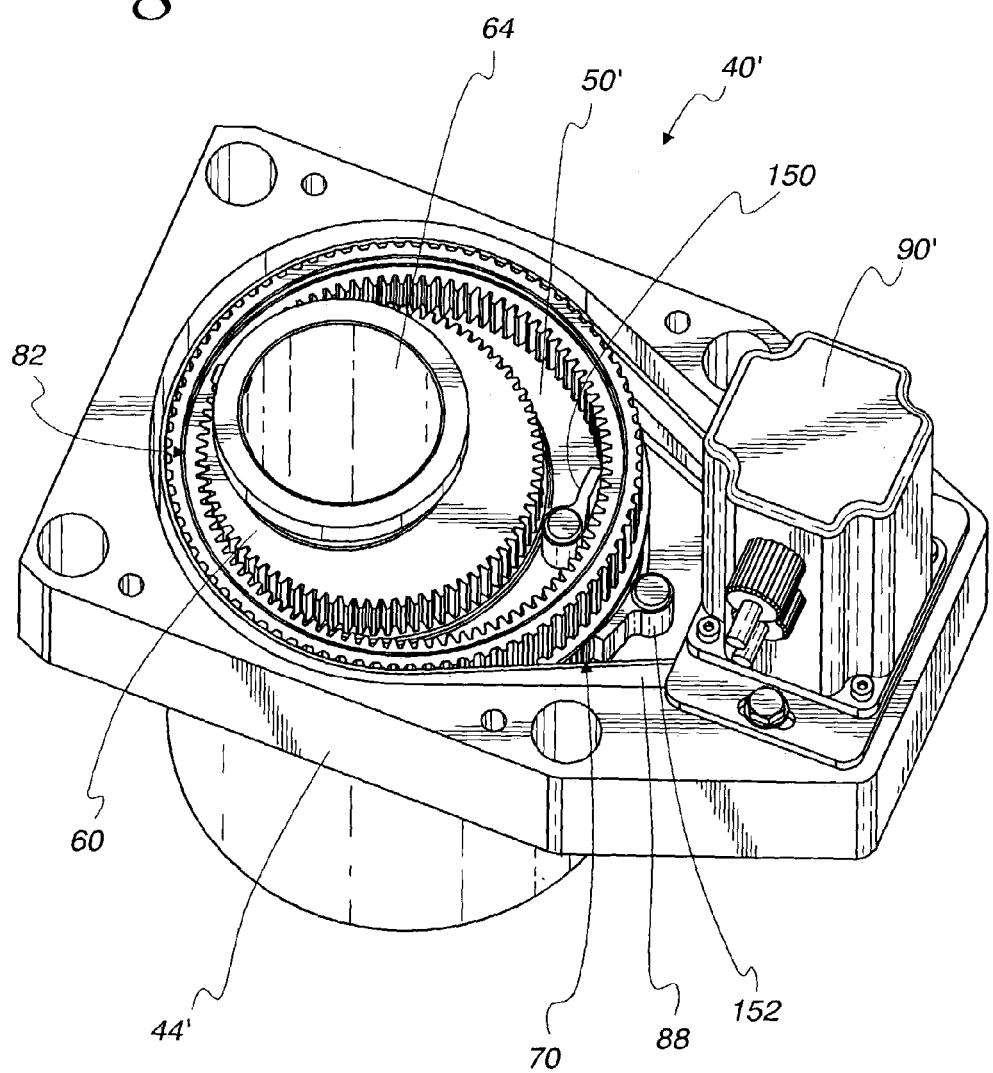
FIG. 6 is a perspective view of an alternate embodiment tool moving device operated by a single drive.

An alternate tool mount 40' particularly adapted for moving a tool 30 along a circular path using only one servo motor 90' is disclosed in FIG. 6. In this figure and the description thereof, components which are common to the first described structure (in FIGS. 1–4) are given the same reference numeral, and components which are similar but modified are given the same reference numeral but with prime added (e.g., 40').

As can be seen in FIG. 6, an inner, or second, carrier 60 with an eccentric cylindrical opening 64 for a tool 30 is rotatably carried in an eccentric cylindrical opening of an outer, or first, carrier 50'. The outer carrier 50' is rotatable secured within the housing 44'. The longitudinal, cylindrical axes of the outer carrier 50', inner carrier 60, and tool mount opening 64 correspond to the axes 52, 58, 66, respectively, as shown in FIGS. 2 and 4. A timing belt 88 is driven by the servo motor 90' to selectively rotate the ring gear 82.

A first one way check lever, pawl, or lock 150 is secured to the first carrier 50' and is biased (e.g., by a torsion spring, not visible) against the inner gear teeth 84 of the ring gear 82 so as to engage the teeth 84. Thus, when the ring gear 82 is rotated clockwise as viewed from above as in FIG. 6, the pawl 150, along with the outer carrier 50' on which the pawl

150 is mounted, will be rotated together with the ring gear 82 in the clockwise direction about the first axis 52.

A second one way check lever, pawl, or lock 152 is secured to the housing 44' and suitably biased (e.g., by a torsion spring, not visible) against the teeth of the outer gear 70 of the outer carrier 50' to prevent the outer carrier 50' from being rotated counterclockwise (as viewed from above as in FIG. 6). Thus, when the ring gear 82 is rotated counterclockwise, the outer carrier 50' will remain stationary (relative to the housing 44') and thus only the inner carrier 60 will rotate, with such rotation occurring about the second axis 58 which remains fixed relative to the housing 44'.

With this tool mount 40', the carriers 50', 60 may first be homed using proximity switches or other suitable devices as previously described. In the preferred home position, the three axes 52, 58, 66 are aligned in a single plane. From that home position, the ring gear 82 may be rotated in a counterclockwise direction by the servo motor 90', causing only the inner carrier 60 to rotate (as the second lock 152 prevents rotation of the first carrier 50'), with such rotation causing the third axis 66 to change its spacing relative to the first axis 52. Once that rotation has positioned the third axis 66 at a spacing R from the first axis 52 which is equal to the radius of the desired circular path (such as can be determined as previously described), the servo motor 90' may be reversed to rotate in a clockwise direction to rotate the ring gear 82 in the clockwise direction. Since the first lock 150 will cause the ring gear 82 and outer carrier 50' to turn together as a unit in the clockwise direction, the inner carrier 60 will essentially be locked in position relative to the outer carrier 50' whereby the mounted tool 30 oriented along the third axis 66 will be fixed at the selected distance R from the first axis, thereby following a circular path having a radius R.

As has previously been noted, the present invention, such as included in the particular above-described structures, may be advantageously used to provide an apparatus which is compact, inexpensive and efficient, and permits tools to be reliably positioned and moved to perform a variety of operations, including cutting undistorted holes having small radii and/or sharp corners. The present invention may also be applied, for example, to move a marking tool along a workpiece or to merely position a drill or punch at a desired operating position on a workpiece. Other types of tools may also be moved along, and/or positioned at, a workpiece according to the teachings of the method and apparatus aspects of the invention.

It will be readily apparent from the foregoing detailed description of the invention and from the illustrations thereof that numerous variations and modifications may be effected without departing from the true spirit and scope of the novel concepts or principles of this invention.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

What is claimed is:

1. An apparatus for cutting an elongate workpiece along a cutting path with a cutting tool, said apparatus comprising:
    a workpiece drive adapted to selectively move a supported workpiece in the direction of an X-axis in a mutually orthogonal X, Y, and Z-axis coordinate system;
    a tool mount, including
        a first rotatable carrier having a first axis of rotation and a first drive gear,
        a second carrier carried by said first carrier for rotation about a second axis, said first and second axes being spaced apart,
        gear teeth on said second carrier, said gear teeth being circular about said second axis,
        a tool holder adapted to secure the tool to the second carrier with the tool oriented generally parallel to and spaced from the second axis, and
        a ring gear rotatable about said first axis and engaging said gear teeth on said second carrier;
    a drive mechanism adapted to selectively drive said first drive gear and said ring gear to selectively position and move said tool; and
    a guide ring adapted to support said tool mount for motion in said Y and Z directions and for rotational movement about a workpiece.

2. The apparatus of claim 1, wherein said first and second axes are spaced apart a distance S and said tool and said second axis are spaced apart a distance T, whereby said apparatus is adapted to cut paths fitting within a circle having a radius S+T.

3. The apparatus of claim 2, wherein S=T whereby said apparatus is adapted to cut any path fitting within a circle having a radius S+T.

4. The apparatus of claim 1, wherein said drive mechanism includes first and second drives which are adapted to selectively drive said first carrier and said ring gear, respectively, through different angles of rotation to position said tool at a selected distance from said first axis of rotation.

5. The apparatus of claim 1, wherein said drive mechanism includes a first drive and a second drive which are adapted to drive said first drive gear and said ring gear, respectively, at an equal rate of rotation whereby said tool is moved in a circle about said first axis of rotation.

6. The apparatus of claim 1, wherein said drive engages said ring gear, and further comprising:
    a first drive lock locking said first carrier to said ring gear when said ring gear is driven in a first direction of rotation; and
    a second drive lock preventing rotation of said first carrier when said ring gear is driven in a second direction of rotation opposite the first direction of rotation.

7. The apparatus of claim 1, further comprising a tilt support between said guide ring and said tool mount, said tilt support being selectively tiltable relative to a workpiece surface lying generally in said X-Y plane to compensate for the angle of the side of the kerf or to provide a selected bevel cut.

8. An apparatus for positioning a tool relative to a workpiece, comprising:
    a first carrier rotatable on a first axis;
    a second carrier carried by said first carrier and rotatable about a second axis defined by said first carrier, said second axis being in a parallel and offset eccentric relationship to said first axis;
    a tool holder associated with said second carrier in an offset eccentric relationship to said second axis;
    a drive mechanism selectively rotatably driving said first carrier about said first axis and said second carrier about said second axis to selectively position said tool holder;
    external pear teeth on said second carrier;
    a ring pear rotatable about said first axis and engaging said external gear teeth on said second carrier;
    a first drive for selectively rotating said first carrier; and
    a second drive for selectively rotating said ring gear.

9. The apparatus of claim 8, wherein said tool may be selectively positioned within an area circular about the first axis, said area having a radius which is the sum of the eccentric relationship of the second carrier to the first axis and the eccentric relationship of the tool holder to the second axis.

10. The apparatus of claim 8, wherein said first and second axes are spaced apart a distance S and said tool holder and said second axis are spaced apart a distance T, whereby said apparatus is adapted to cut paths fitting within a circle having a radius S+T.

11. The apparatus of claim 10, wherein S=T whereby said apparatus is adapted to cut any path fitting within a circle having a radius S+T.

12. The apparatus of claim 8, wherein said first drive and second drive are adapted to drive said first carrier and said ring gear at an equal rate of rotation whereby said tool holder is moved in a circle about said first axis of rotation.

13. The apparatus of claim 8, further comprising:
a first drive lock locking said first carrier to said ring gear when said ring gear is driven in a first direction of rotation; and
a second drive lock preventing rotation of said first carrier when said ring gear is driven in a second direction of rotation opposite the first direction of rotation.

14. The apparatus of claim 8, wherein:
said first carrier includes a sleeve having a cylindrical receiving bore that defines said second axis; and
said second carrier includes
a cylindrical exterior portion rotatably received within said cylindrical receiving bore, and
an external gear circular around said second axis.

15. The apparatus of claim 14, further comprising a ring gear rotatable about the first axis and engaging said second carrier external gear, said ring gear having a radius substantially equal to the radius of the external gear plus the eccentric distance between said first axis and said second axis.

16. The apparatus of claim 8, wherein said first and second axes are substantially parallel to an X-axis in a mutually orthogonal X, Y, and Z-axis coordinate system, and said first carrier is supported on a guide ring adapted to support said first carrier for motion in said Y and Z directions and for rotational movement about said X-axis.

17. An apparatus for positioning a tool relative to a workpiece, comprising:
a first carrier rotatable on a first axis;
a second carrier carried by said first carrier and rotatable about a second axis defined by said first carrier, said second axis being in a parallel and offset eccentric relationship to said first axis;
a tool holder associated with said second carrier in an offset eccentric relationship to said second axis; and
a drive mechanism selectively rotatably driving said first carrier about said first axis and said second carrier about said second axis to selectively position said tool holder;
wherein said first and second axes are substantially parallel to an X-axis in a mutually orthogonal X, Y, and Z-axis coordinate system, and said first carrier is supported on a guide ring adapted to support said first carrier for motion in said Y and Z directions and for rotational movement about said X-axis; and
further comprising a workpiece drive adapted to selectively move a supported workpiece through said guide ring in the direction of the X-axis.

18. The apparatus of claim 17, further comprising a tilt support between said guide ring and said tool holder, said tilt support being selectively tiltable relative to a workpiece surface lying generally in said X-Y plane to compensate for the angle of the side of the kerf or to provide a selected bevel cut.

* * * * *